C. H. WILLS.
MEANS FOR SILENCING CRANK SHAFTS.
APPLICATION FILED NOV. 12, 1920.
1,430,344. Patented Sept. 26, 1922.
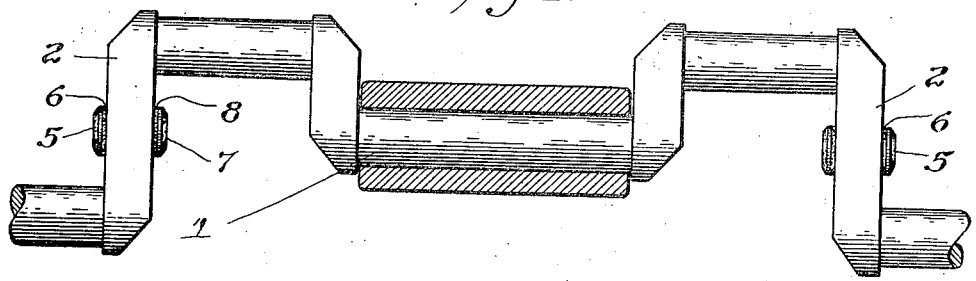
Fig. 1.
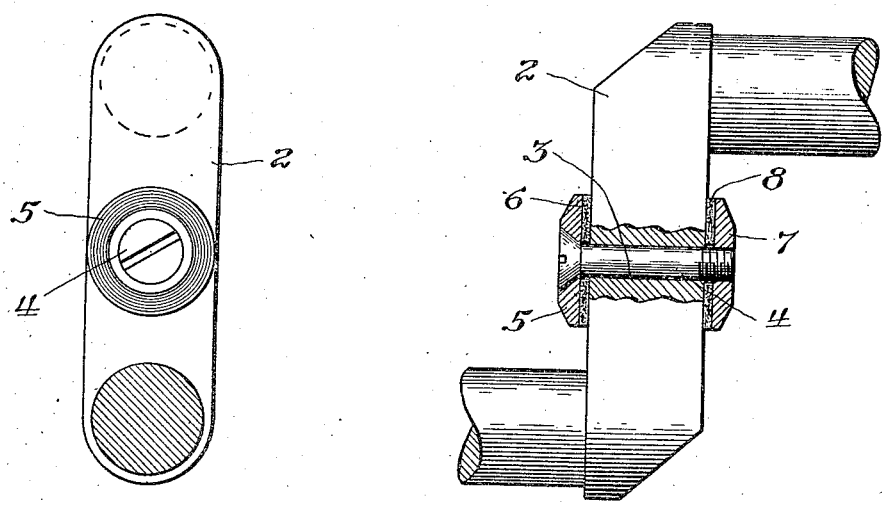
Fig. 2.
Fig. 3.
Inventor.
C. Harold Wills,
Attys.

Patented Sept. 26, 1922.

1,430,344

UNITED STATES PATENT OFFICE.

CHILDE HAROLD WILLS, OF MARYSVILLE, MICHIGAN.

MEANS FOR SILENCING CRANK SHAFTS.

Application filed November 12, 1920. Serial No. 423,682.

*To all whom it may concern:*

Be it known that I, CHILDE HAROLD WILLS, a citizen of the United States, residing at Marysville, in the county of St. Clair and State of Michigan, have invented certain new and useful Improvements in Means for Silencing Crank Shafts, of which the following is a specification.

This invention relates to means for silencing crank shafts of hydrocarbon motors, and its object is to provide means for interrupting or damping the sound vibrations of the crank shaft to thereby lessen the noise of the motor, without impairing the stress resisting capacity of the shaft.

To this end, the invention is embodied in preferable form in the construction hereinafter described and illustrated in the accompanying drawing, in which—

Figure 1 is a longitudinal side view of a part of the crank shaft of a hydrocarbon motor showing the essential feature of the invention applied thereto;

Fig. 2 an end view of one face of a crank shaft cheek; and

Fig. 3 an enlarged side view showing the vibration interrupting means in section.

The invention comprises the securing of a member separate from the body of the shaft to a part of the shaft between the ends thereof, and bearing against the surface of the shaft for the purpose of interrupting the sound vibrations transmitted by the metal of the shaft body, and thus preventing the creation of a hum or ring due to the vibrant quality of the shaft, and in preferably locating this vibration interrupting member on such part of the shaft as not to impair this stress resisting capacity of that body. The invention may consist of a piece of metal separate from the body of the shaft and firmly secured to the cheek, or it may consist of a paper disk or washer also secured against the surface of the cheek, or it may comprise both these members. In either case the additional parts serving to interrupt sound vibrations, and thus deaden the ring of the shaft.

Referring to the drawings, 1 designates a cylindrical bearing portion of the crank shaft and 2 a crank throw or cheek extending angularly therefrom. Extending transversely through a neutral section of each cheek, that is, substantially at the longitudinal center thereof, is an opening 3. In this opening is inserted a retaining member, such as a screw 4, or similar member, having a beveled head. This head is adapted to engage a countersunk metal washer 5, which serves to interrupt or deaden the sound vibration or ring of the crank shaft and thus silence the latter. This damping member is preferably of a diameter equal to the width of the face of the cheek.

In the particular embodiment of the invention herein illustrated, additional sound damping means are provided consisting of a disk or washer of paper 6, or similar material, and a clamp between the middle washer and the face of the cheek. The screw shown herein extends through the cheek, and is adapted to receive a similar metal washer 7 and a paper washer 8 on its threaded end.

Having thus described my invention, what I claim is:

1. In a hydrocarbon motor, a shaft, and a non-metallic vibration interrupting member secured to said shaft.

2. In a hydrocarbon motor, a crank shaft, a vibration interrupting member secured to a cheek of said shaft between the ends thereof.

3. In a hydrocarbon motor, a crank shaft, a sound damping member secured to the cheek thereof, in line with the axis of rotation of the shaft, said member being symmetrical about said axis.

4. In a hydrocarbon motor, a crank shaft, a cheek of said crank shaft having an opening through its neutral section, a vibration interrupting member bearing against said cheek, and a retainer for said member in said opening, said member and retainer being symmetrical about the neutral axis.

5. In a hydrocarbon motor, a crank shaft having an opening through a neutral section of a cheek thereof, disk shaped washers bearing against each opposite face of said cheek, and a member passing through said opening and retaining said members against said faces.

6. In a hydrocarbon motor, a crank shaft having an opening through a neutral section of a cheek thereof, a retaining member passing through said opening, and a non-metallic vibration interrupting member at each end of said retaining member and secured thereby against the opposite faces of said cheek.

7. In a hydrocarbon motor, a crank shaft having an opening through a neutral section of a cheek thereof, a metal washer, a paper washer between said metal washer and the face of the cheek, and a retaining member engaging said metal washer.

Signed at Marysville, Michigan, this 19th day of October, 1920.

CHILDE HAROLD WILLS.